Z. M. Paul.
Brick Machine.

Nº 11,760.  Patented Oct. 3, 1854.

UNITED STATES PATENT OFFICE.

ZACHARIAH M. PAUL, OF ALEXANDRIA, LOUISIANA.

BRICK-MACHINE.

Specification of Letters Patent No. 11,760, dated October 3, 1854.

*To all whom it may concern:*

Be it known that I, ZACHARIAH M. PAUL, of Alexandria, in the parish of Rapides and State of Louisiana, have invented a certain new and useful Improvement in Brickmaking-Machines, of which the following is a full, clear, and exact description, reference being had to the accompanying drawings, which form a part of this specification, and in which—

Figure 3:
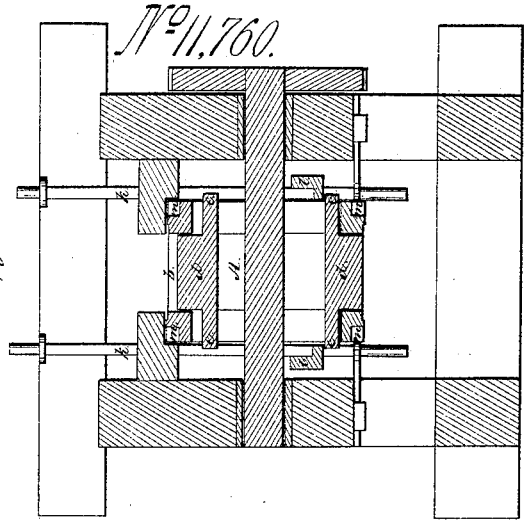
Figure 2:
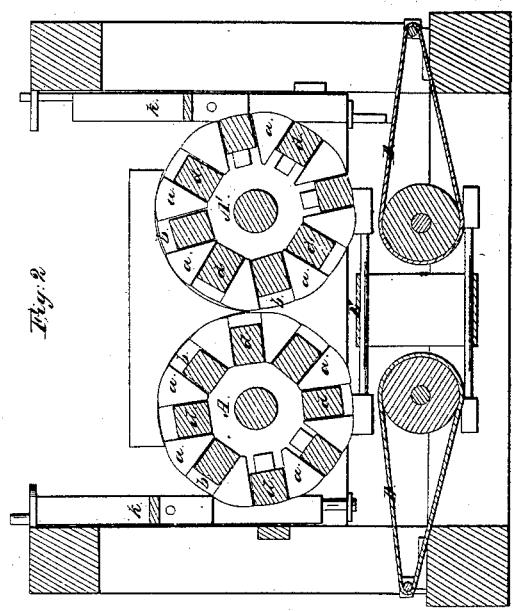
Figure 1:
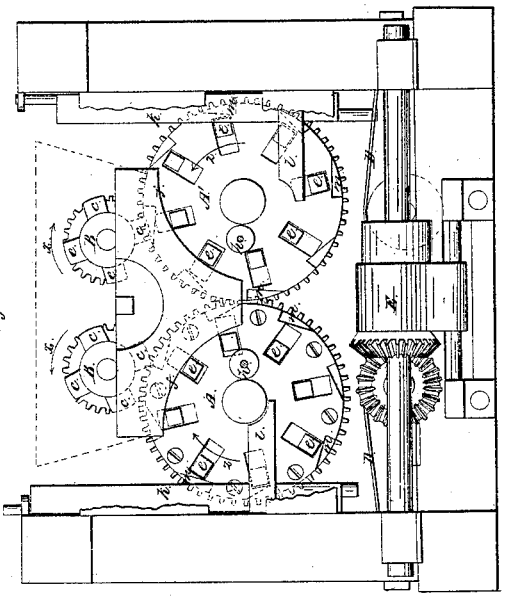

Figure 1, represents an end elevation of the machine, part of the frame being broken off, to show more clearly the working parts. Fig. 2, represents a vertical transverse section. Fig. 3, is a vertical longitudinal section, taken through the center of one of the mold cylinders.

In the machine represented in the accompanying drawings, the clay is deposited in a hopper, or receptacle situated over the two mold cylinders (A, A') and may be fed thereto by traveling belts passing the clay between rollers, and subjecting it to the action of any suitable pulverizing apparatus. The clay thus prepared, is drawn off from the hopper, by the mold cylinders (A, A') which are hung on horizontal shafts, and are geared together by a pair of spur, or cog wheels, consequently these cylinders will revolve in opposite directions as indicated by the arrows (x). Within the hopper containing the clay, are two filling and pressing cylinders (B, B') that rotate in opposite directions as indicated by the arrow (x), and that are driven at suitable velocities to cause the plungers (c) projecting radially from them, to mesh into the molds (b), in the mold cylinders, for about half the depth of the molds, as the cylinders rotate. The object of these rotating plungers (c), is not to press the whole quantity of clay required to form the brick into the molds, but to insure the inner or bottom corners of the molds being filled with clay, and the clay hard pressed there, which in other machines, where the mold contains its full quantity of clay, before pressure is applied is seldom or never the case, causing the brick to be made more or less imperfect at its edges, by reason of the clay not being properly filled into the inner or bottom angles of the molds. After the molds in the mold cylinders are thus partially filled, they fill up or take in more clay, during the remainder of their travel through the hopper. The molds in the peripheries of the mold cylinders, are divided by solid metal blocks (a), of the same width and length as the molds (b). The mold cylinders (A, A') work in close contact with each other, and are so set on their shafts, that a metal block (a) in the one cylinder, is in line with, or directly opposite to a mold space (b), in the other cylinder, at the point where the two cylinders come in contact with each other. The plungers or cylindrical metal surfaces, at each end of the molds are shrouded, or covered by the bottom edge of the hopper resting on them, and extending down between the two cylinders, and covering exactly to the edge of the molds, thus it will be seen that there is no metallic surface exposed to the clay in the hopper, which, during the rotation of the mold cylinders, ever comes in contact with other metallic surface on the other cylinder, consequently it is impossible for these cylinders to gather clay on such parts, as it would accumulate on, and eventually either stall or break the machine. The solid metal blocks (a) between the molds, for the length of the molds, are made of a quicker convex shape, than is due to a circle forming the circumference of the cylinders.

As the cylinders rotate the solid blocks (a) of one cylinder, enter or mesh into the molds of the other cylinder, and vice versa, entering one at a time, and alternately from either cylinder, at the point at which said cylinders come in contact, and thus press the clay into the molds to form the brick, which will be left straight on its outer face, by reason of the greater convexity of the metal pressing surfaces, than that of the circle described by the outer face of the brick, in its travel with the cylinder. By each solid metal block (a) thus entering, (as it approaches into horizontal line with,) a mold (b) in the adjoining cylinder, and the metal blocks so operating in the two cylinders alternately, the clay will be hard pressed or rammed as it were into the molds, and a solid brick is thereby formed, but to insure yet greater solidity and firmness pressure may also be brought to bear on the inner face of the brick, simultaneously with the squeezing action of the convex surfaces of the intervening metal blocks (a), and the clay in the mold be forced out against the convex pressing and straightening surfaces (a), by means of platens (d) in the molds, having no radial action, as will hereafter appear.

Projecting from either end of the platens (d) are stubs (e), which, as the cylinders rotate pass under curved plates or ways (f)

on the outside of the cylinders and between them at their top, and bearing an eccentric relation to the cylinders, so that the platen of either mold, as it arrives at or passes its top vertical position, is gradually forced down or in (should it not fall of its own weight or be inclined to stick,) during the travel of the mold through the hopper, and thus the platen is insured working to its proper depth, to give the required capacity to the mold for the brick. These plates (f) are bolted or otherwise secured to the frame of the machine.

In or about a horizontal line intersecting the two mold cylinders, and on the insides of the shafts of said cylinders, are rollers (h) hung to the frame or side standards of the machine. These rollers are situated at such a distance from the center of the cylinders, that on the stub ends (e) of either platen passing them, the rollers cause the platen to be forced radially outward, and press the clay in the mold against the convex pressing surface (a) of the other cylinder entering the mold. Thus a perfectly solid and hard pressed brick will be produced. The pressed brick in the mold, is then carried around to its bottom vertical position, when the weight of the platen induces it to fall out, but before it has time to fall, I cause a frame (k) having striking feet (l) to descend suddenly, and striking the stubs (e), of the platen, projecting at each end of the cylinder, to throw out the platen and release the brick from the mold; this manner of applying a blow as it were to release the brick will cause the brick to be delivered cleaner and more perfect than if a gradual force or pressure were applied.

The releasing frame (k), one of which is arranged to either mold cylinder, and operate alternately the one with the other, is held up from operating on the platen when not required by studs or pins projecting from said frames, and resting on the flanges of the mold cylinders above their horizontal center line, but when required to drop the frame to knock out the brick, the bearing studs of the releasing frame drop into notches (m) cut in the flanges of the cylinders, and so allow the frame to drop and drive out the platen, when by the continued rotation of the cylinders the back end of the notches (m) catch onto the bearing studs and by them, raise the releasing frame, the notch passing from under the bearing stud leaves the frame suspended as before on the flanges of the cylinder until another notch (m) comes around, when the releasing frame again drops and expels another brick, there being a releasing notch on either end of the cylinder to every mold.

Traveling belts (D) passing around pulleys are arranged underneath the mold cylinders for carrying off the brick as fast as ejected from the molds. Another traveling belt (E) passing over a pulley and rollers, is arranged to run at right angles to the brick removing belts and between them, across the machine, to carry off any loose dirt or clay, that might drop from between the mold cylinders.

In making the brick out of mud or tempered clay, instead of the two brick removing belts, the bricks from both cylinders may be deposited on a plank or board, passed or put in motion over rollers, to prevent the handling of the bricks in removing them to dry: Also a scraper may be used, attached to the frame near the bottom, to scrape the faces of the platens and the convex pressing blocks clean of any adhering clay, after the brick has been ejected from the mold; and revolving sand or dust sieves, may be arranged above the top of the cylinders, and outside of the hopper, to sprinkle dust in the molds, to prevent the clay forming the brick sticking therein.

I do not claim the device of pressing-blocks or projections on the periphery of one wheel to compress the clay into bricks in molds which are formed in the periphery of the second as this has been done before; but,

Having thus described my invention, what I claim therein as new and useful and desire to secure by Letters Patent is—

1. The above described construction and arrangement of the two mold cylinders (A A') which work in close connection one with the other, forming the intervening blocks (a) between the molds (b), of quicker convexity than is due to the circle which would circumscribe them, and so arranging the said block and molds of the two cylinders, that they alternately mesh one into the other, whereby the outer face of the brick will be left straight, and the brick be hard pressed in the molds, of either cylinder alternately, in continuous succession, substantially as specified.

2. I also claim ejecting the brick from the mold by percussion, or sudden jerk, applied to the platen, by means of the releasing frame (k), arranged and operating, substantially as specified.

In testimony whereof, I have hereunto subscribed my name this 28th day of August 1854.

Z. M. PAUL.

Witnesses:
A. GREGORY,
WM. M. SMITH.